UNITED STATES PATENT OFFICE.

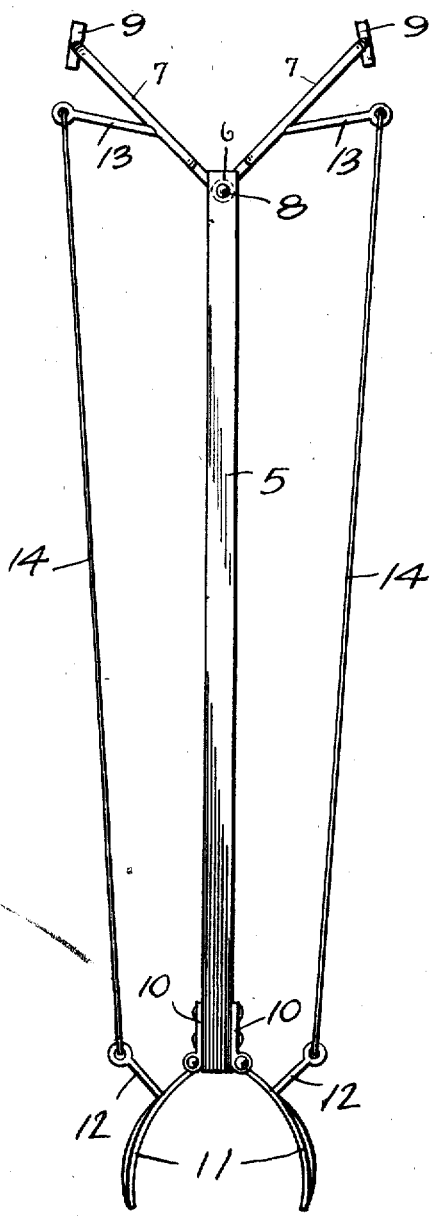
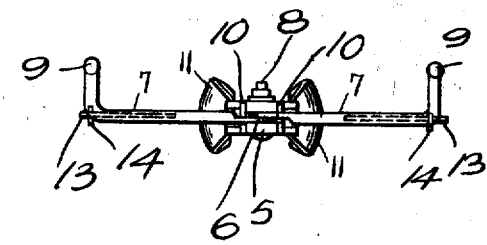

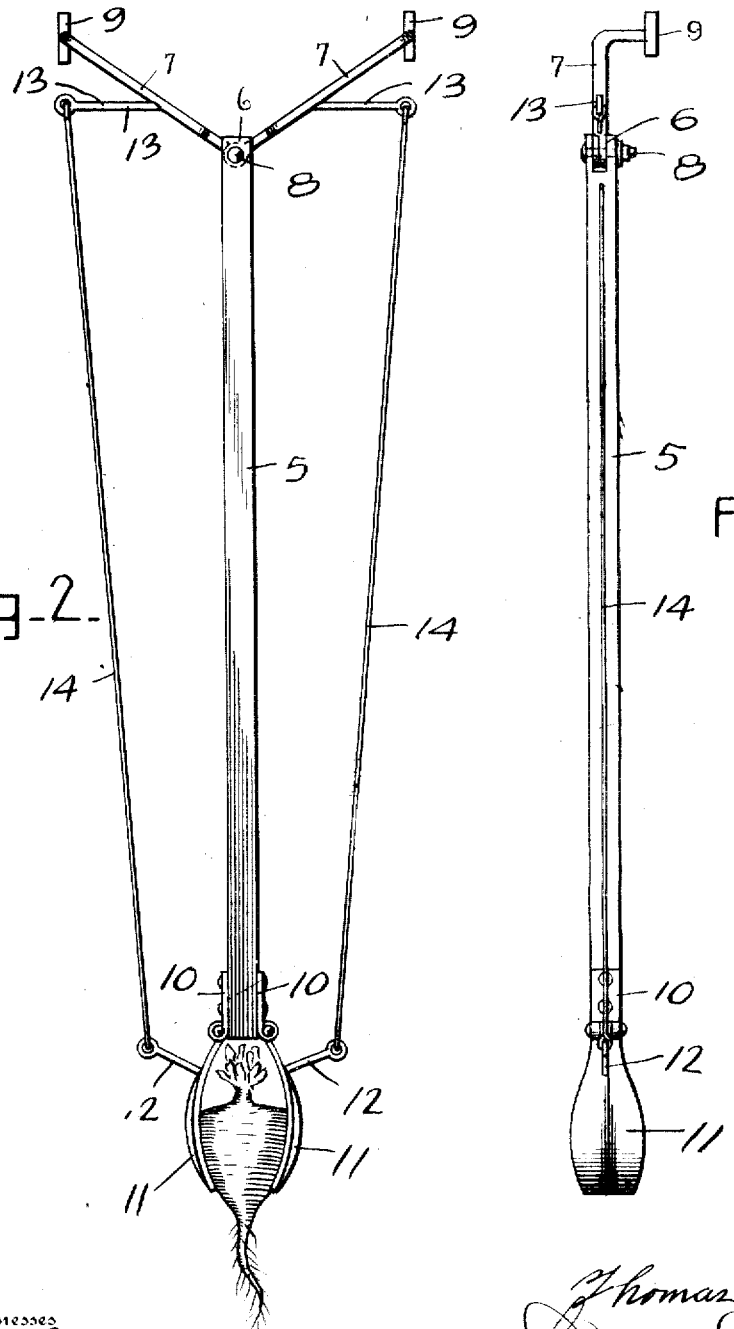

THOMAS GOOCH, OF MARYSVILLE, IDAHO.

TRANSPLANTER.

No. 902,070.         Specification of Letters Patent.         Patented Oct. 27, 1908.

Application filed August 29, 1907. Serial No. 390,649.

*To all whom it may concern:*

Be it known that I, THOMAS GOOCH, a citizen of the United States, residing at Marysville, in the county of Fremont, State of Idaho, have invented certain new and useful Improvements in Transplanters; and I do hereby declare the following to be a full, clear, and exact description of the invention, such as will enable others skilled in the art to which it appertains to make and use the same.

This invention relates to new and useful improvements in transplanters and it has particular reference to a device for transplanting beets or similar vegetables.

In its broad conception, the invention comprises an elongated member, the lower end of which carries pivoted jaws and the upper end of which carries pivoted handles, and in this connection it is a primary object of the invention to provide novel operating means between the handles and the jaws.

The details of construction will appear in the course of the following description in which reference is had to the accompanying drawings forming a part of this specification, like characters of reference designating similar parts, throughout the several views, wherein:

Figure 1 is an elevation showing the open position of the jaws. Fig. 2 is a similar view showing the closed position of the jaws. Fig. 3 is a side elevation thereof. Fig. 4 is a top plan view thereof.

In the accompanying drawings, the numeral 5 designates an elongated member or shank having its upper end formed with bifurcations 6, the handle members being designated by the numeral 7 and their lower ends, disposed between the bifurcations 6 and pivotally held by means of a pin 8. The handle members 7, at their upper ends, are formed with offset hand grips 9. The member 5 is provided at its lower end at opposite sides thereof, with hinge straps 10, to which are connected transplanting jaws 11, the latter being formed with upwardly and outwardly inclined extensions 12. The handle members 7 are formed adjacent their lower ends with upwardly and outwardly inclined angular extensions 13 and the latter have pivotal connection with links 14 which are in turn pivoted to the extensions 12, of the jaws 11. The extensions 13 are approximately central of the length of the handle members 7 and are arranged in the same plane therewith. The extensions 12 are also arranged in the same plane with the handle members 5.

In use, by raising the handle members 7, on their pivot, the curved jaws 11 will be moved away from one another in position to grab the beet, and this last action is attained by moving the members 7 downwardly on their pivot, whereby, said jaws are brought together about the beet, at which time the latter may be lifted from the ground.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

An implement of the class described comprising an elongated member, handle members pivoted to the upper ends thereof and formed with angular extensions projecting therefrom approximately centrally thereof and in the same plane therewith, gripping jaws pivoted to the lower ends thereof and formed with angular extensions arranged in the same plane with the handle members and links connecting the respective extensions of said handles with the respective extensions of said jaws.

In testimony whereof, I affix my signature, in presence of two witnesses.

THOMAS GOOCH

Witnesses:
C. C. SHETLER,
G. L. DOCKSTADER.